UNITED STATES PATENT OFFICE.

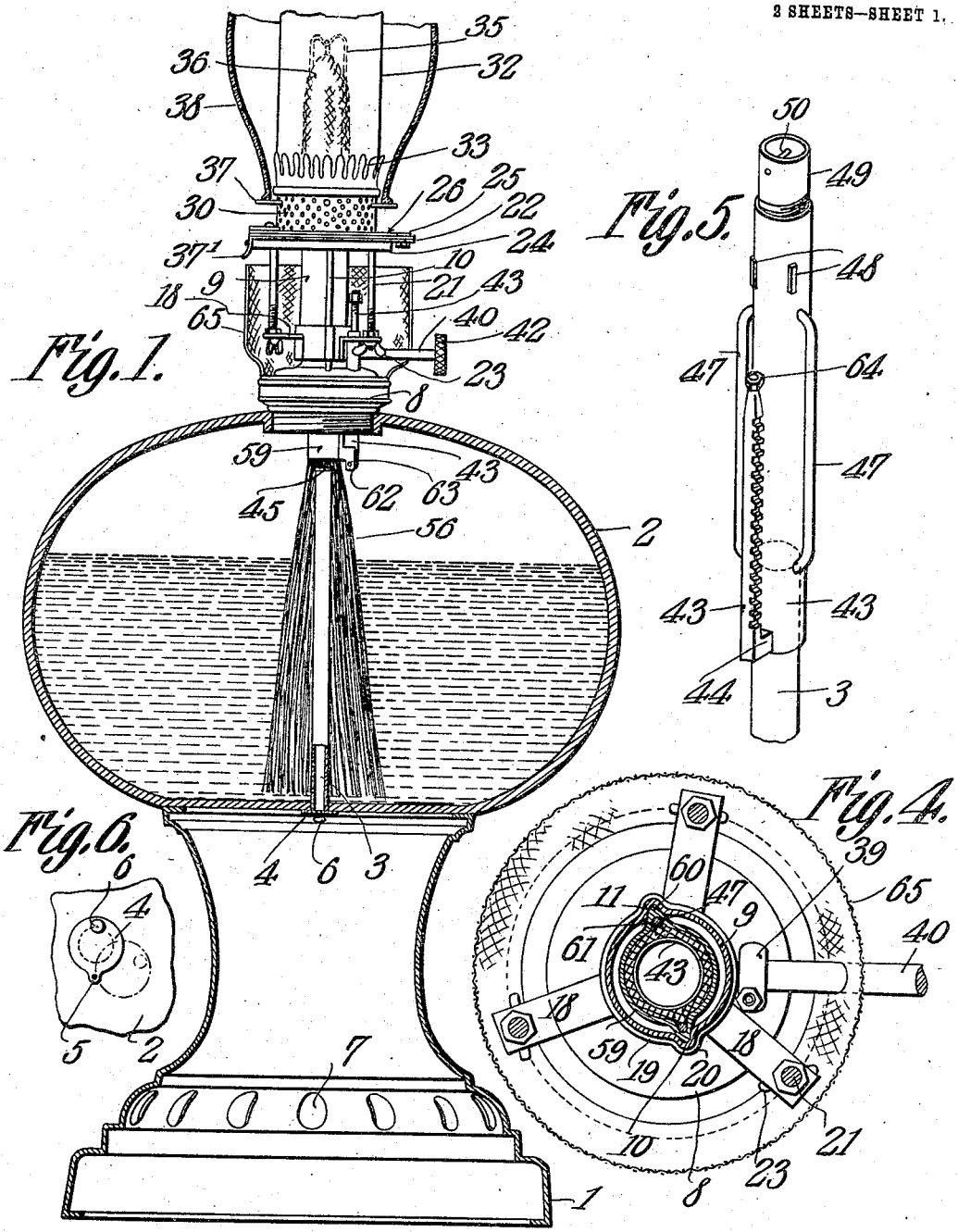

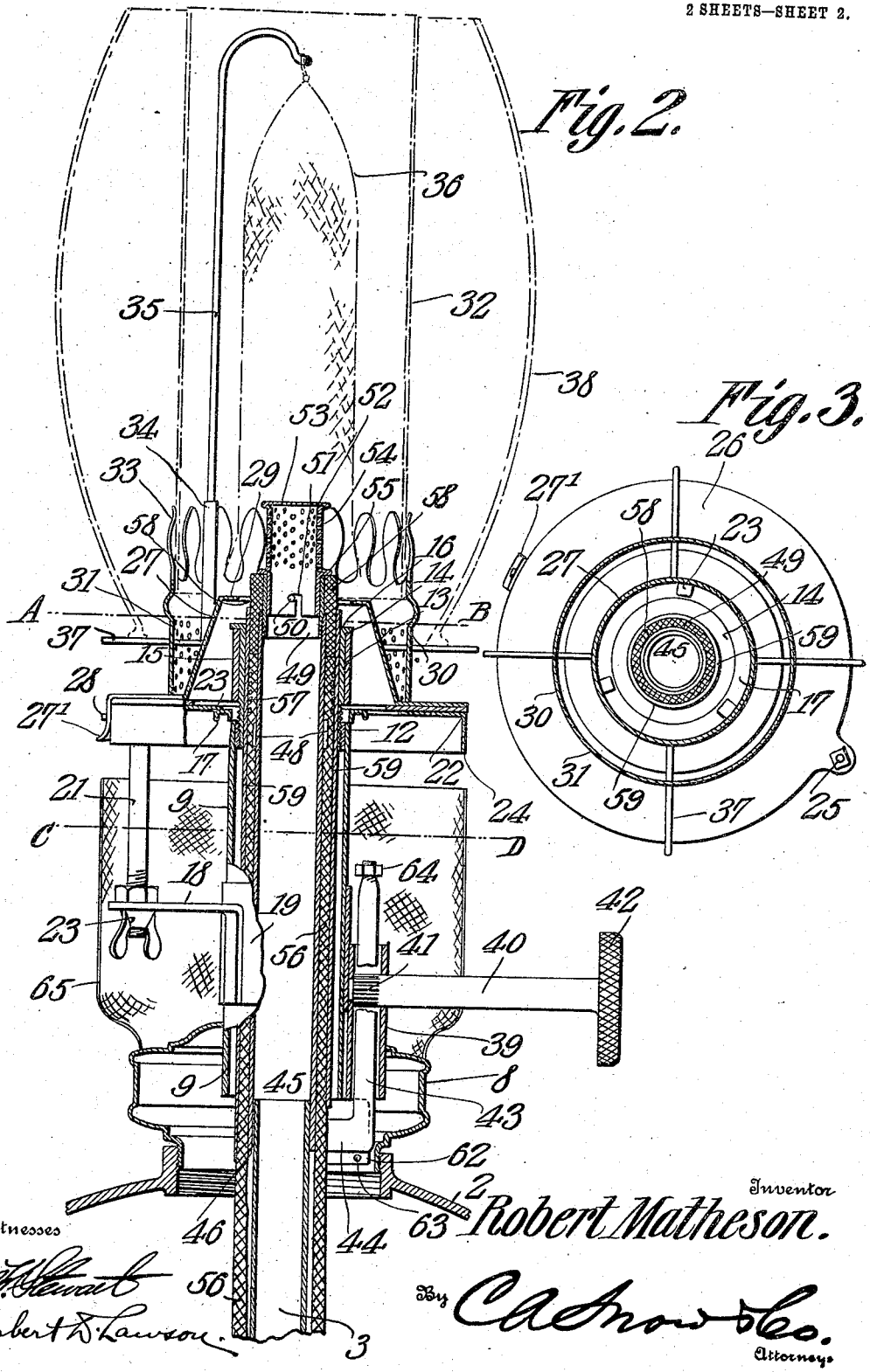

ROBERT MATHESON, OF QUARTZSITE, ARIZONA TERRITORY.

INCANDESCENT LAMP.

932,486. Specification of Letters Patent. Patented Aug. 31, 1909.

Application filed November 23, 1908. Serial No. 464,125.

*To all whom it may concern:*

Be it known that I, ROBERT MATHESON, a citizen of the United States, residing at Quartzsite, in the county of Yuma and Territory of Arizona, have invented a new and useful Incandescent Lamp, of which the following is a specification.

This invention relates to incandescent lamps of that type designed to use kerosene or the like as a fuel, and its object is to provide a lamp of this type utilizing separate coöperating wicks for burning and feeding purposes respectively, means being provided whereby the burning wick can be more or less exposed in a convenient manner for the purpose of regulating the size of the flame.

A further object is to provide means designed to prevent liquid fuel from running over the sides of the lamp from the wick after the flame has been extinguished.

A further object is to provide novel means whereby a current of cool air can be supplied to the central portion of the burner and of the lamp bowl or reservoir, said air being used, in connection with the vapor from the oil, to produce a highly combustible gas at the burner and also constituting means for maintaining the contents of the bowl or reservoir cool under all conditions.

Another object is to provide an air-conducting member constituting a vent for the escape of vapor generated within the bowl or reservoir.

A still further object is to provide a lamp having a gallery so mounted and constructed as to permit access to be easily had to the wick and other parts of the burner without the necessity of removing the chimney or mantle of the lamp.

Another object is to provide efficient means whereby the supply of air to the burner may be conveniently controlled.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a central vertical section through the base and bowl or reservoir of a lamp, and showing the burner and adjacent parts of the lamp in elevation, the guard screen and the globe of the lamp however being shown in section. Fig. 2 is an enlarged central vertical section through the burner of the lamp. Fig. 3 is a section on line A—B Fig. 2. Fig. 4 is a section on line C—D Fig. 2. Fig. 5 is a perspective view of the holding tube of the feed wick and of the rack connected thereto. Fig. 6 is a bottom plan view of the central draft regulator.

Referring to the figures by characters of reference 1 designates the base or pedestal of the lamp, on which is arranged the bowl or reservoir 2, there being an air-conducting tube 3 arranged vertically within the bowl 2 and extending upwardly from the bottom thereof, the upper end of said tube being located adjacent the top of the bowl and above the level of the oil contained within said bowl. The lower end of the tube 3 is designed to be partly or entirely closed by means of a damper 4, which is pivotally mounted as at 5 upon the bottom of the bowl, and can be conveniently shifted by means of a small knob 6, so as to assume a position either entirely or partly across the lower end of the tube, and thus control the passage of air into said tube. In order to permit air to conveniently flow into said tube when it is open, apertures are preferably formed in the base or pedestal 1, as indicated at 7.

The hollow base 8 of the burner is designed to be secured to the top of the bowl 2 in any preferred manner, and arranged within, and extending upwardly from this base is the main tube 9 of the burner, said tube being open at both ends and having longitudinal ribs struck outwardly therefrom, as indicated at 10, there being corresponding grooves 11 within the tube and produced by stamping the ribs 10. The tube 9 is open at both ends, but its upper end is formed with interior screw-threads 12, engaged by the threaded end of a tubular extension 13, which, as indicated particularly in Fig. 2, has an annular flange 14 at its upper or outer end and has its exposed portion surrounded by a band 15 of copper or other material constituting a good heat-conductor. The tubular extension 13 is slightly flared at its upper end, as indicated at 16, so as to constitute a drip-cup for the purpose hereinafter set forth. A deflecting ring 17 is slidably mounted on the tubular extension 13 and its band 15 and normally rests upon the upper ends of the ribs 10, it being understood however that, when desired, this ring can be slid upwardly upon the band 15 to a desired elevation and for the purpose hereinafter set forth.

Arms or brackets 18 extend radially from a sleeve 19, which is slidably mounted on the main tube 9 and has ribs 20 struck outwardly therefrom so as to form grooves in which the ribs 10 are mounted, said ribs and grooves thus constituting guides to prevent the sleeve 19 from rotating upon the tube 9, but, at the same time, permitting said sleeve to slide upon the tube. The brackets 18 are adjustably engaged by the lower end portions of supporting rods 21, which rods project downwardly from the base ring 22 of the gallery of the lamp. These lower end portions of the rods 21 are screw-threaded and engaged by adjusting nuts 23, so that the ring 22 can be supported any desired distance from the brackets 18, but is at all times rigidly connected thereto and to the sleeve 19. The ring 22 has inwardly extending lugs or fingers 23, designed to overhang the deflecting ring 17. An annular flange 24 extends downwardly from the margin of the ring 22.

Pivotally mounted upon the ring 22, as at 25, is the base flange 26 of the cone 27 of the burner, said cone and flange being designed to swing laterally into position upon the base ring 22, there being a catch 27' upon the flange 26 for engaging a suitable locking stud 28 or the like upon the flange 24 of ring 22. The cone 27 has an inwardly directed flange 29 at its upper end designed to overhang the tubular extension 13. A cylindrical member 30 is formed integral with the flange 26 of the cone 27, and surrounds said cone, said member being provided with a number of apertures 31, through which air is free to pass upwardly into the chimney 32 of the lamp. Fingers 33 project upwardly from the cylindrical member 30 and constitute means for gripping and supporting the chimney. One or more socket members 34 are formed upon the outer face of cone 27 and engaged by a rod or rods 35, from which the incandescent mantle 36 is designed to be suspended. Arms 37 radiate from the cylindrical member 30 and the cone 27 and constitute supports for a globe 38.

A tubular guide 39 is mounted on the base 8 close to the main tube 9 and a spindle 40 is revolubly mounted within said guide and has teeth 41 upon its inner end portion and within the guide, while the outer end of said spindle is provided with a knob 42 whereby said spindle can be conveniently rotated. The teeth 41 engage teeth upon a rack 43 slidably mounted within the guide 39, said rack being arranged at one end of, and extending upwardly from an arm 44, projecting radially from the inner wick-holding tube 45 of the burner. The internal diameter of this tube 45 is slightly greater than the external diameter of the tube 3 heretofore referred to, and these two tubes are designed to telescope, the minute space between them constituting a vent for the escape of all gases which may accumulate within the bowl 2 of the lamp. This vent has been clearly indicated at 46 in Fig. 2.

Guide rods 47 are arranged longitudinally upon the tube 45 and formed upon said tube above these rods are stop lugs 48. As shown in Figs. 2 and 5, a short tubular extension 49 is screwed into the upper end of tube 45 and has a transverse pin 50 in the upper end thereof. This pin is designed to be received by angular slots 51, formed in a cylindrical mixing cap 52, which is insertible into the tubular extension 49 and has its outer end closed as indicated at 53, there being a plurality of apertures 54 formed within the wall of this cap and constituting outlets for air and vapor supplied to the cap by the tubes 3 and 45. This cap has an annular flange 55 designed to bear upon the outer end of the tubular extension 49.

A number of wick-strings or cords 56 are secured to the upper end portion of the tube 45 by means of a binding cord 57 designed to tightly clamp the cords upon the tube directly above the studs 48, so as to prevent the cords from sliding downwardly upon the tube 45. These cords constitute the feed or suction wick of the lamp, and their upper ends contact with a cylindrical wick 58 constituting the burning wick, and which is designed to absorb oil from the upper ends of the cords 56. The feed or suction wick is held tightly clamped about the tube 45 by means of a jacket 59 having longitudinal ribs 60 struck upwardly therefrom and forming interior grooves 61 into which the rods 47 slide while the parts are being assembled. Ribs 60 are designed to be seated within the grooves 11 in the main tube 9. This arrangement of the parts has been indicated in Fig. 4. In order that the two tubes 45 and 59 may be held against longitudinal displacement relative to each other, ears 62 are extended in one direction from the tube 59, and the arm 44 of rack 43 extends between these ears and is prevented from being withdrawn from between them by a stop pin 63 connecting the two ears and disposed in the path of the arm 44. In order to prevent the rack 43 from withdrawing from the tubular guide 39 and out of engagement with the teeth 41 a stop, preferably in the form of a nut 64, is arranged upon the upper end of the rack. A cylindrical screen shield 65 is mounted on the base 8 and serves to conceal the rods 21 and the other parts of the burner located between the base and the gallery.

After the lamp has been filled, and it is desired to light the same, the entire gallery is moved upwardly, this causing the sleeve 19 to slide longitudinally along the main tube 9. Said sleeve will move against the deflecting ring 17 and lift it upwardly against the flange 14 of the tubular extension 13, and, as soon as the lower edge of the sleeve 19 has passed the upper edge of the tube 9, said sleeve can be partly rotated, so as to move its grooves out of register with the ribs 10 on the tube 9, and said ribs will therefore support the sleeve and entire gallery in elevated position. This will bring the base ring 22 above the level of the upper end of the cap 52, and, by releasing the fastener of the flange 26, said flange, together with the cone, lamp, chimney and mantle, can be swung laterally out of position above the burner. The sleeve 19 can again be partly rotated so as to bring its interior grooves into register with the ribs 10, whereupon said sleeve and the gallery can be lowered to their normal positions. The wick 58 will thus be in position above the base ring 22, but to one side of the cone 27 and the parts thereon, and the said wick can therefore be readily trimmed and ignited, and, by reversing the foregoing operation, the chimney and mantle can be again positioned upon the base-ring 22 and over the wick 58. This wick absorbs oil from the upper end portion of the feed or suction wick 56, said oil leaving the wick 58 in the form of vapor, which commingles with the air admitted to the burner through the openings in the cap 52. As the wick 58 is burned away it can be elevated as desired above the upper end of the tubular extension 13, simply by turning the stem 40, so as to cause the teeth 41 thereon to shift the rack 43 and the wick-holding tubes.

Especial importance is attached to the provision of the center draft which maintains the contents of the bowl cool, and permits any vapor which may accumulate therein to flow outwardly to the burner and there be consumed. The provision of the laterally and vertically movable gallery whereby the wick can be trimmed and lighted without the necessity of removing the chimney is also an important feature of the present invention and one which will readily appeal to users of lamps.

The deflecting ring 17 serves to concentrate the heat from the burner within and above the cone 27, where it is most needed, the heat conducted by the band 15 assisting materially in the vaporizing of the fuel carried upwardly by the wick 58. By screwing the tube 13 into tube 9 the same can be adjusted longitudinally when the wick 58 burns downward, so that practically all of said wick can be used. Moreover, by flaring the upper end of the tube 13 the same forms a drip-cup to receive oil exuding from the wick 58 after the flame has been extinguished. Heretofore, in lamps of this character, the oil thus discharged has flowed over the lamp and thus been very objectionable. This cup, however, will entirely obviate the overflow of surplus oil. By adjusting the nuts 23 on the rods 21 the gallery can be elevated relative to the deflecting ring 17 and the space between the base ring 22 and the deflecting ring 17 increased and the supply of air to the burner through the cone 27 correspondingly enlarged.

Various changes can of course be made in the construction and arrangement of the parts without departing from the spirit or sacrificing the advantages of the invention.

What is claimed is:—

1. In a lamp a main tube, adjustable rods supported thereby, a ring fixedly connected to and movable with the rods, said rods and ring being shiftable longitudinally of and guided by the tube, and a gallery pivotally mounted upon the ring and movable laterally out of normal position when the ring is elevated.

2. In a device of the class described a main tube, tubular wick-holding devices adjustably mounted within the main tube, said main tube having guides thereon, a slidable and laterally movable gallery normally positioned around the main tube, and means slidably mounted upon the main tube and guides and coöperating therewith for supporting the gallery above the main tube and the wick-holding devices, said gallery being shiftable laterally when in such position.

3. In a lamp a main tube, a sleeve slidably mounted thereon, a ring movable with and adjustably connected to the sleeve, a gallery pivotally mounted upon the ring and movable laterally out of normal position when the ring is elevated, and means upon the tube and coöperating with the sleeve to support said sleeve, ring and gallery in elevated position.

4. In a device of the class described a main tube, an inner wick-holding tube, projecting devices thereon, a wick surrounding and movable with said inner tube and extending over said projecting devices, means for binding one end of said wick to the inner tube above the projecting devices, said devices constituting stops for the binding means, an outer wick-holding tube surrounding the wick and movable with the inner tube, both of said wick-holding tubes extending beyond one end of the wick to constitute a seat for a burning wick, and means for adjusting the wick-holding tubes within the main tube.

5. In a device of the class described a main tube, outer and inner wick-holding tubes therein and movable together, longitudinally extending interengaging means upon the tubes for holding the same against independent rotation, and means for adjusting the wick-holding tubes longitudinally within the main tube, the said wick-holding tubes constituting means for supporting a feed wick and a burning wick.

6. In a device of the class described a main tube, inner and outer wick-holding tubes adjustably mounted within the main tube, a tubular extension adjustably engaging the inner tube, and a mixing cap detachably supported within said extension and extending above the inner wick-holding tubes, said cap having apertures therein and said tube and extension constituting an air-duct.

7. In a device of the class described a main tube, inner and outer wick-holding tubes movable together longitudinally within the main tube, a feed wick disposed between said holding tubes and extending beyond one end thereof, there being a socket between said holding tubes at the other end of the feed wick, a burning wick disposed within said socket, a tubular extension adjustably mounted within the inner holding tube and extending beyond the burning wick, and an apertured mixing cap detachably mounted within said extension and extending therebeyond, the inner holding tube constituting an air flue.

8. A device of the class described comprising a main tube, inner and outer wick-holding tubes adjustable longitudinally within the main tube, a gallery normally surrounding said tubes, and means upon the main tube and coöperating therewith for supporting the gallery out of normal position and above the tubes, said gallery comprising a base member, a cone thereon and mounted to swing laterally relative thereto, and separate mantle and chimney-supporting devices movable with the cone.

9. In a device of the class described a main tube, wick-holding devices therein, a gallery normally surrounding the tube and means slidably mounted upon and coöperative with the tube for holding the gallery out of normal position and above the tube and wick-holding devices, said gallery comprising a base ring, a cone pivotally mounted thereon and disposed to swing laterally relative thereto, said wick-holding devices being designed to normally project into the cone, and mantle-supporting means movable with the cone.

10. In a device of the class described a burner, and a gallery movable vertically relative thereto, said gallery comprising a base portion, a member pivotally mounted on the base portion and shiftable laterally relative thereto, chimney-carrying means upon said pivoted portion.

11. In a device of the class described, a burner, a gallery shiftable vertically relative thereto and comprising a base portion and a horizontally movable chimney-carrying portion mounted on said base portion, and coöperating means upon the burner and gallery respectively for supporting said gallery in elevated position relative to the burner.

12. In a device of the class described a burner, a gallery shiftable vertically relative to the burner, said gallery comprising a base portion and a chimney-carrying portion movably mounted upon and shiftable laterally relative to the base portion, means for supporting the gallery in its elevated position, and an adjustable connection between said means and the gallery.

13. In a device of the class described a main tube, a tubular extension adjustably mounted thereon, said extension constituting a drip-cup, a heat-conducting band upon said extension tubular wick-holding devices adjustable longitudinally within the main tube, an extension adjustably mounted on one of said devices, an apertured mixing cap detachably mounted within the adjustable extension and extending above the first named tubular extension, and an air-conducting tube telescoping into said tubular wick-holding device.

In testimony that I claim the foregoing as my own, I have hereto affixed my signature in the presence of two witnesses.

ROBERT MATHESON.

Witnesses:
CHARLES SEWELL ALLEN,
WILLIAM E. SCOTT.